US008923107B2

(12) United States Patent
Oinuma (10) Patent No.: US 8,923,107 B2
(45) Date of Patent: Dec. 30, 2014

(54) OPTICAL DISC DEVICE AND CONTROLLING METHOD THEREOF

(71) Applicant: Funai Electric Co., Ltd., Osaka (JP)

(72) Inventor: Yoshitomo Oinuma, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/045,941

(22) Filed: Oct. 4, 2013

(65) Prior Publication Data

US 2014/0115613 A1    Apr. 24, 2014

(30) Foreign Application Priority Data

Oct. 19, 2012  (JP) ................................ 2012-232291

(51) Int. Cl.
*G11B 11/00*  (2006.01)
(52) U.S. Cl.
USPC ....................................... 369/53.3; 369/53.37
(58) Field of Classification Search
None
See application file for complete search history.

(56) References Cited

U.S. PATENT DOCUMENTS

| | | | | |
|---|---|---|---|---|
| 5,485,445 A | * | 1/1996 | Oinoue et al. | 369/53.29 |
| 5,990,596 A | * | 11/1999 | Kitai et al. | 310/316.02 |
| 7,924,667 B2 | * | 4/2011 | Yun et al. | 369/47.4 |
| 2004/0001398 A1 | * | 1/2004 | Okumura et al. | 369/30.17 |
| 2004/0004911 A1 | * | 1/2004 | Yoon et al. | 369/30.17 |
| 2005/0083800 A1 | * | 4/2005 | Okada et al. | 369/44.28 |
| 2006/0023576 A1 | * | 2/2006 | Takeda | 369/44.11 |
| 2007/0211580 A1 | * | 9/2007 | Ko | 369/30.1 |
| 2007/0223334 A1 | * | 9/2007 | Ko | 369/47.49 |
| 2008/0089189 A1 | * | 4/2008 | Mizuno | 369/30.1 |

FOREIGN PATENT DOCUMENTS

| | | |
|---|---|---|
| JP | H0798877 A | 4/1995 |
| JP | 2001-266375 A | 9/2001 |

\* cited by examiner

*Primary Examiner* — Paul Huber
(74) *Attorney, Agent, or Firm* — Osha Liang LLP (57) ABSTRACT

An optical disc device includes a pickup, a driving mechanism that drives the pickup, and a driving controlling portion that applies an initial driving voltage to the driving mechanism over a specific time interval up until the pickup arrives at an outermost position on an outer peripheral side, the initial driving voltage causing the pickup to arrive at the outermost position. After the specific time interval has elapsed, the driving controlling portion applies, to the driving mechanism, an adjustment driving voltage of a voltage amplitude less than a voltage amplitude of the initial driving voltage or a driving frequency less than a driving frequency of the initial driving voltage.

20 Claims, 8 Drawing Sheets

OPTICAL DISC DEVICE AND CONTROLLING METHOD THEREOF

FIELD OF TECHNOLOGY

The present invention relates to an optical disc device and to a controlling method thereof, and, in particular, relates to a pickup controlling device for structuring an optical disc device, and to the controlling method thereof.

BACKGROUND ART

Optical disk devices such as DVD (Digital Versatile Disc) players and BD (Blu-ray Disc™) players are provided with pickups for reading out data that is stored on optical discs such as DVDs and BDs. The pickups are driven toward the inner peripheral side or the outer peripheral side of the disc through a driving mechanism such as, for example, a spindle motor (referencing, for example, Patent Citation 1).

In optical disk devices there is the need to perform positioning control with good precision in order to stop the pickup at the desired location, in order to read the optical disc properly.

Here, in optical disk devices, typically there is variability in the driving load of the driving mechanism due to component variability, such as, for example, variability in the mass of the pickups, variability in the friction in the spindle motor, and the like. The voltage amplitude or driving frequency required to drive a driving mechanism with a small driving load are less than the voltage amplitude and driving frequency required to drive a driving mechanism with a large driving load.

As a technology related to controlling the pickup positioning to handle such component variability there is, for example, a technology, disclosed in Patent Citation 2, wherein a slide error signal is used to calculate an amount of eccentricity of the driving mechanism resulting from the component variability, and adjusting the period of application of a constant voltage pulse based on the amount of eccentricity. In the optical disc device of Patent Citation 2, the constant voltage pulse is a constant voltage pulse that is large enough to absorb the variability of friction, for example, caused by the component variability. That is, it is a voltage pulse that has the voltage amplitude and driving frequency required for driving a driving mechanism with a large driving load. Moreover, in the optical disc device of Patent Citation 2, the driving voltage is gradually decreased when stopping, so as to prevent a sudden stop.

In controlling the positioning of a pickup, there is re-zeroing control for stopping the pickup at the position wherein the disc reading is to start. In re-zeroing control, when the power supply is turned ON, the pickup is moved to a mechanically limited position at the outer peripheral side of the optical disc device (hereinafter "outermost position"). In re-zeroing control, after the pickup has been moved to the outermost position, for example, it is then moved to the innermost position. In re-zeroing control, the pickup is then moved towards the outer peripheral portion of the disc, and then the positioning is stopped at the starting position for reading the disc (hereinafter termed the "re-zeroing position").

Here the use of the technology in Patent Citation 2 in controlling when moving the pickup to the outermost position enables the pickup to be stopped well at the outermost position. However, in the optical disc device of Patent Citation 2, a process for calculating the amount of eccentricity of the driving mechanism, based on a slide error signal, is necessary, which complicates the device structure. In this case, controlling the number of manufacturing steps and controlling manufacturing cost can be difficult.

PATENT CITATIONS

[Patent Citation 1] Japanese Unexamined Patent Application Publication 2001-266375
[Patent Citation 2] Japanese Unexamined Patent Application Publication H07-098877

Because of this, the position of the pickup is controlled without requiring a procedure for calculating the amount of eccentricity of the driving mechanism, and with control that is identical regardless of the optical disc device.

However, when attempting to make the pickup stop at the outermost position through controlling the driving voltage calculating the amount of eccentricity of the driving mechanism, it is necessary to set the driving voltage that is required in driving a driving mechanism with a large driving load so as to not produce a driving mechanism that does not work (the constant voltage pulse in Patent Citation 2). In this case, a driving mechanism with a light driving load will arrive at the outermost position before a driving mechanism with a large driving load arrives at the outermost position. The driving voltage is applied until a driving mechanism with a large driving load arrives at the outermost position, and thus in a driving mechanism with a small driving load the driving voltage will continue to be applied even after arrival at the outermost position. Given this, in a driving mechanism with a small driving load, sometimes there is deep gear tooth skipping in the spindle motor, causing a return toward the inner peripheral side, preventing stopping at the outermost position.

SUMMARY OF THE INVENTION

One or more embodiments of the present invention provide an optical disc device, and a controlling method thereof, able to perform positioning control of the optical head with good precision, able to handle component variability, and having a simple structure.

An optical disc device according to one aspect of the present invention may comprise: a pickup; a driving mechanism that drives the pickup; and a driving controlling portion that applies an initial driving voltage to the driving mechanism over a predetermined time interval up until the pickup arrives at an outermost position, on an outer peripheral side, the initial driving voltage causing the pickup to arrive at the outermost position; wherein: after the predetermined time interval has elapsed, the driving controlling portion applies, to the driving mechanism, an adjustment driving voltage of a voltage amplitude less than a voltage amplitude of the initial driving voltage or a driving frequency less than a driving frequency of the initial driving voltage.

In one or more embodiments of the optical disc device of this aspect, a pickup comprising a driving mechanism with a large driving load may stop at the outermost position. In contrast, a pickup comprising a driving mechanism of a small driving load may, as described above, arrive at the outermost position earlier than a pickup comprising a driving mechanism of a large driving load. Moreover, in the pickup comprising the driving mechanism with the small driving load, the driving voltage may continue to be applied, even after arriving at the outermost position, until a pickup comprising a driving mechanism of a large driving load arrives at the outermost position. Because of this, in a pickup comprising a driving mechanism with a small driving load there may be gear tooth skipping in the spindle motor, and the pickup may stop one gear tooth toward the inner peripheral side from the outermost position.

Furthermore, in one or more embodiments of the optical pickup device of this aspect, the driving controlling portion may apply an adjustment driving voltage, having a voltage amplitude or driving frequency that is less than the initial driving voltage. In a pickup comprising a driving mechanism with a large driving load, the adjustment driving voltage may have a small voltage amplitude or driving frequency so the pickup will not be driven, and thus may maintain the state wherein the pickup is stopped at the outermost position. In contrast, with a pickup comprising a driving mechanism that can be driven by the adjustment driving voltage (for example, a driving mechanism with a small driving load), it may be driven to the outer peripheral side from the stopped position after the application of the initial driving voltage has been completed. As a result, the pickup comprising the driving mechanism that can be driven by the adjustment driving voltage can be also stopped at the outermost position.

That is, one or more embodiments of the optical disc device of the aspect set forth above is able to increase the precision of positioning without requiring another mechanism for detecting the variability in the size of the driving load due to component variability.

In one or more embodiments, the driving load may be expressed by the coefficient of dynamic friction of the driving mechanism.

In one or more embodiments, the driving controlling portion may reduce the voltage amplitude of the adjustment driving voltage in a stepwise manner, for example.

One or more embodiments of this structure may cause the control of the driving voltage by the driving controlling portion to be easier.

In one or more embodiments, the driving controlling portion may reduce the voltage amplitude of the adjustment voltage driving continuously, for example.

In one or more embodiments, an individual driving mechanism may stop when the amplitude of the driving voltage falls below a voltage amplitude that is able to drive the applicable mechanism. At this time, the individual driving mechanism can be considered to have stopped in a state wherein the individual driving mechanism pushes against the outermost position, and thus this makes it possible to stop all driving mechanisms at the outermost position with better precision.

In one or more embodiments, the driving controlling portion may reduce the driving frequency of the adjustment driving voltage in a stepwise manner, for example.

One or more embodiments of this structure cause the control of the driving voltage by the driving controlling portion to be easier.

In one or more embodiments, the driving controlling portion may reduce the driving frequency of the adjustment driving voltage continuously, for example.

In one or more embodiments, an individual driving mechanism may stop when the driving frequency of the driving voltage falls below a driving frequency that is able to drive the applicable mechanism. At this time, the individual driving mechanism can be considered to have stopped in a state wherein the individual driving mechanism pushes against the outermost position, and thus this makes it possible to stop all driving mechanisms at the outermost position with better precision.

In one or more embodiments, the optical pickup device may further comprise a plurality of driving mechanisms. In one or more embodiments, the plurality of driving mechanisms may for example comprise at least two types of driving loads. In one or more embodiments, the voltage amplitude and the driving frequency of the initial driving voltage may be a voltage amplitude and driving frequency that can drive the driving mechanism having the largest driving load from among the plurality of driving mechanisms.

One or more embodiments of this structure make it possible to stop at the outermost position, even for a pickup comprising a driving mechanism of a large driving load.

In one or more embodiments, the voltage amplitude or driving frequency of the adjustment driving voltage may be a voltage amplitude or driving frequency able to drive the driving mechanism with a smallest driving load from among the plurality of driving mechanisms. The time interval during which the adjustment driving voltage may be applied (application time) may be a time interval set in advance so that the driving mechanism with the smallest driving load will arrive at the outermost position.

One or more embodiments of this structure make it possible to stop at the outermost position, even for a pickup comprising a driving mechanism of a small driving load.

In another aspect, a controlling method for an optical disc device comprising a pickup and a driving mechanism for driving the pickup may include applying an initial driving voltage to the driving mechanism over a predetermined time interval up until the pickup arrives at an outermost position, on an outer peripheral side, the initial driving voltage causing the pickup to arrive at the outermost position; and after the predetermined time interval has elapsed, applying, to the driving mechanism, an adjustment driving voltage of a voltage amplitude less than a voltage amplitude of the initial driving voltage or a driving frequency less than a driving frequency of the initial driving voltage.

One or more embodiments of the optical disc device controlling method of the aspect set forth above is able to increase the precision of positioning without requiring another mechanism for detecting the variability in the size of the driving load due to component variability.

One or more embodiments of the present invention relate to an optical disc device comprising this type of processing portion and to a controlling method for an optical disc device having the procedure executed by this processing portion as a step.

In another aspect, a program is provided for causing a computer to function as the processing portion that is included in the optical disc device, or a program for causing a computer to execute the step included in the controlling method for the optical disc device. Moreover, this program may be distributed through a non-volatile computer-readable storage media such as a CD-ROM (Compact Disc-Read-Only Memory), or through a communication network such as the Internet, or the like.

One or more embodiments of the optical disc device and controlling method set forth above are able to handle component variability and perform positioning control of the optical head with good precision through a simple structure.

DETAILED DESCRIPTION OF THE INVENTION

Embodiments of the present invention will be explained in detail below, using the drawings. The embodiments explained below each illustrate examples of the present invention. The quantitative values, shapes, materials, structural elements, arrangement positions and forms of connections between the structural elements, steps, step sequences, and the like, given in the embodiments set forth below, are all merely examples, and are not intended to limit the present invention. The present invention is specified by the claims. Consequently, of the structural elements in the embodiments set forth below, those structural elements that are not described in the independent claims may not be necessary in achieving the object of the present invention, but rather are explained as examples.
(Embodiment 1)

An optical disc device and controlling method thereof in the present embodiment will be explained based on FIG. 1 through FIG. 5.

Figure 5:
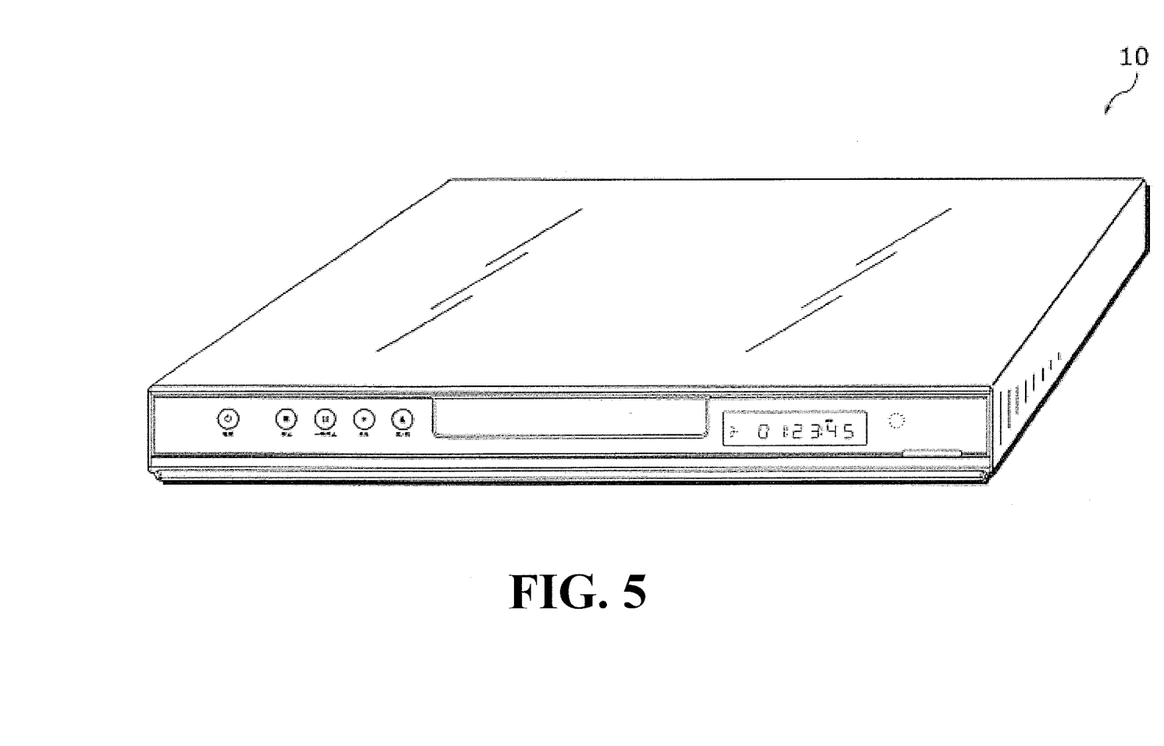
FIG. 5 is a perspective diagram of a DVD player according to an embodiment of the present invention.

In the present embodiment, the optical disc device 10 is a DVD player 10 as illustrated in FIG. 5. However, other optical disc devices, such as for example such as BD (Blu-ray Disc™) players, may be used.

Based on a control signal from a remote control device 40, the optical disc device 10 according to the present embodiment may read in video data stored on a DVD disc 20 and perform a procedure for playing back the video data on a television receiver 30. The video data may be data that includes motion picture data and audio data. The audio data may include voice data produced by humans and acoustic data, such as music.

While in the present embodiment examples of video data of content include movie, or the like, or video data of a video recording, stored on a DVD disc 20, there is no limitation thereto. Other data, such as still image data, motion picture data alone, audio data alone, or the like, may be recorded on the DVD disc 20.

The television receiver 30 may be a conventional television receiver 30 and may comprise a displaying portion 32 for displaying, on a display screen, a video image that displays motion picture data or a still image that displays still image data and a speaker 31 for playing back audio data.

The remote control device 40 may be a device whereby an operator operates the DVD player, where a control command signal that indicates, for example, a control command in response to a key operation by an operator, is sent to the control disc device 10 using a wireless signal, such as in infrared communication or the like.

[1. Structure of the Optical Disc Device 10]

Figure 1:
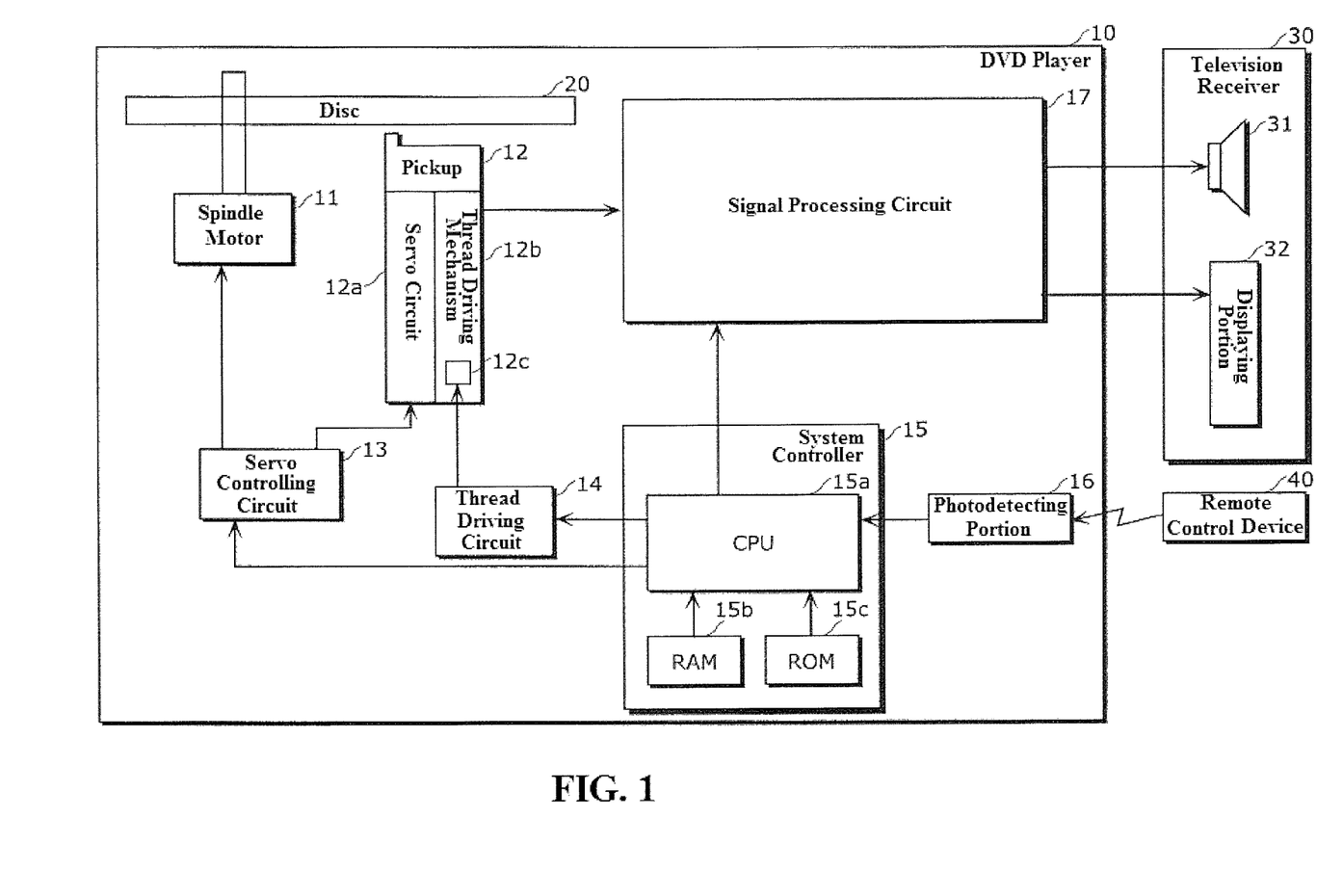
FIG. 1 is a block diagram illustrating one example of a structure of a DVD player (one example of an optical disc device) according to an embodiment of the present invention.

First, an example of the structure of the optical disc device 10 will be explained based on FIG. 1. FIG. 1 is a block diagram illustrating an example structure of an optical disc device 10 according to an embodiment of the present invention.

The optical disc device 10, as illustrated in FIG. 1, in the present embodiment may comprise a photodetecting portion 16, a system controller 15 (corresponding to the driving controlling portion), a servo controlling circuit 13, a thread driving circuit 14, a spindle motor 11, a pickup 12, and a signal processing circuit 17.

The structure of the optical disc device 10 is not limited thereto. According to one or more embodiments, the structure of the optical disc device 10 may be different, such as a hard disk. Moreover, the optical disc device 10 may be structured so as to enable more than one disk to be contained at one time within the frame, and may be structured so as to enable continuous playback of a plurality of discs.

The photodetecting portion 16 may receive infrared communication from the remote control device 40, to receive a control command signal sent from the remote control device 40, to output, to the system controller 15, the control command expressed by the control command signal. The communication method for the remote control device 40 is not limited to infrared communication.

The system controller 15, upon receipt of a control command from the photodetecting portion 16, may perform control of the servo controlling circuit 13, the thread driving circuit 14, and the signal processing circuit 17. The system controller 15, as illustrated in FIG. 1, may comprise a CPU 15a (Central Processing Unit), a RAM 15b (Random Access Memory), and a ROM 15c (Read-Only Memory). An application program that includes various types of control programs for controlling the aforementioned servo controlling circuit 13, thread driving circuit 14, and signal processing circuit 17, and the like, may be stored in the ROM 15c. Various types of data used in executing the control procedures may be stored temporarily in the RAM 15b.

When the power supply is turned ON, the system controller 15 may read out the application program from the ROM 15c into the RAM 15b, to execute a control procedure following the aforementioned control commands. In executing the control procedure, the system controller 15 may output thread driving controlling signals for controlling a thread driving mechanism 12b (corresponding to the driving mechanism) to the thread driving circuit 14. Moreover, in executing the control procedure, the system controller 15 may output, to the servo controlling circuit 13, servo control signals for controlling the spindle motor 11, and the servo circuit 12a.

The servo controlling circuit 13 may control the spindle motor 11 and the servo circuit 12a based on servo control signals from the system controller 15.

The thread driving circuit 14 may generate driving voltages for causing the thread motor 12c to rotate in accordance with the thread driving controlling signals from the system controller 15.

The thread driving circuit 14 may generate respective positive-side thread driving voltages and negative-side thread driving voltages through two amplifying circuits, inverting and non-inverting (not shown), in response to the thread driving controlling signals, although not shown. The thread driving circuit 14 may supply, to the thread motor 12c, the positive-side thread driving voltage and the negative-side thread driving voltage.

The spindle motor 11 may rotate and stop the DVD disc 20 based on signals from the servo controlling circuit 13.

The pickup 12 may read out data (RF signals) that are recorded on the DVD disc 20, convert them into digital data, and output them to a signal processing circuit 17. As illustrated in FIG. 1, the pickup 12 may have a servo circuit 12a for controlling the position of an object lens (not shown), and a thread driving mechanism 12b that uses a servo motor 12c as a motive source. The thread driving mechanism 12b may move the pickup 12 in the radial direction of the DVD disc 20 (in the inner peripheral direction or the outer peripheral direction), parallel to the surface of the disc, through causing the thread motor 12c to rotate, in accordance with a driving voltage supplied from the thread driving circuit 14. For example, the thread motor 12c may rotate backward or rotate forward based on the differential voltage between the positive-side thread driving voltage and the negative-side thread driving voltage supplied from the thread driving circuit 14, to cause the pickup 12 to move in the inner peripheral direction or the outer peripheral direction.

The servo circuit 12a may control focus and tracking through adjusting the position of the object lens based on a signal from the servo controlling circuit 13.

The signal processing circuit 17 may perform a procedure for displaying a motion picture on the display screen of the television receiver 30, and for outputting a sound from a speaker 31, using digital data that is inputted from the pickup 12.

For example, the signal processing circuit 17 may first perform an error correcting procedure on the digital data inputted from the pickup 12. The signal processing circuit 17 may separate a compression-coded video bit stream and a compression-coded audio bit stream from the error-corrected bit stream. The signal processing circuit 17 may decode the audio bit stream and then perform D/A conversion to generate a digital audio signal, and output it to the television receiver 30. Moreover, the signal processing circuit 17 may perform a decoding procedure and a converting procedure for converting into the NTSC format on the video bit stream, and then further perform a D/A converting procedure to generate a digital video signal. The signal processing circuit 17 may output the digital video signal to the television receiver 30.

As a result, a motion picture in accordance with the digital video signal may be displayed on the display screen (for example, a liquid crystal panel, a plasma display, or the like) of the television receiver 30, and sound in accordance with the digital audio signal is outputted from the speaker 31.

[2. Operation of the Optical Disc Device 10 (the Control Method)]

Figure 2:
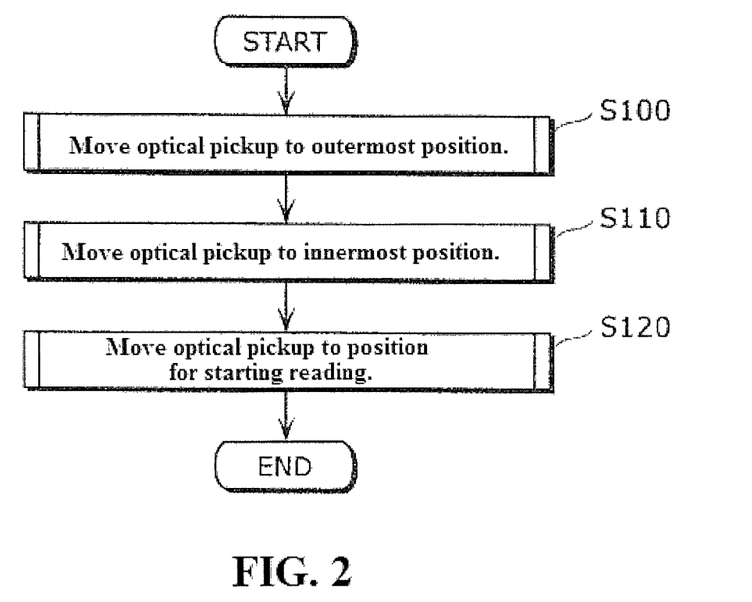
FIG. 2 is a flowchart illustrating a processing sequence for re-zeroing control according to an embodiment of the present invention.

An example of the operation of the optical disc device 10 will be explained next based on FIG. 2 through FIG. 4A. FIG. 2 is a flowchart illustrating the sequence of procedures in the re-zeroing control according to an embodiment of the present invention.

The system controller 15 may start re-zeroing control when the power supply is turned ON. The system controller 15 may first output, to the thread driving circuit 14, a thread driving controlling signal for moving the pickup 12 to the outermost position (Step S100).

In the present embodiment, the system controller 15 changes the voltage amplitude of the driving voltage in three steps in the procedure for moving the pickup 12 to the outermost position. However, two or more than three steps, for example four steps, are also possible. The values of each of the voltage amplitudes and of each of the application time intervals may be values that are set in advance, and, for example, stored in the ROM 15c of the system controller 15 at the time that the product is shipped or in the manufacturing process.

In the method for setting the voltage amplitude of the driving voltage, the driving mechanisms may be grouped into three groups by the driving loads into a group wherein the driving loads are relatively large (driving load Max), a group wherein the driving loads are average (driving load Typ), and a group wherein the driving loads are relatively small (driving load Min). Given this, the required voltage amplitude for driving all of the driving mechanisms within the group is calculated for each of the groups. In this example, V1 refers to the voltage amplitude for the driving load Max, V2 refers to the voltage amplitude for the driving load Typ, and V1 refers to the voltage amplitude for the driving load Min.

The driving load may be the coefficient of dynamic friction of the thread motor 12c.

The voltage amplitude of the driving voltage is not limited to three steps. According to one or more embodiments, the voltage amplitude of the driving voltage may include two steps or four or more steps. The number of steps in the driving voltage may be set as appropriate in consideration of the differences in the amplitudes between the voltage amplitude V1 and the voltage amplitude V3, the required positioning precision, and the like. Moreover, the number of steps in the voltage amplitude may be set so as to be switchable depending on the data to be played back, the type of disk, and the like. Moreover, the methods for setting the voltage amplitude of the driving voltage are not limited to the methods described above.

Figure 3:
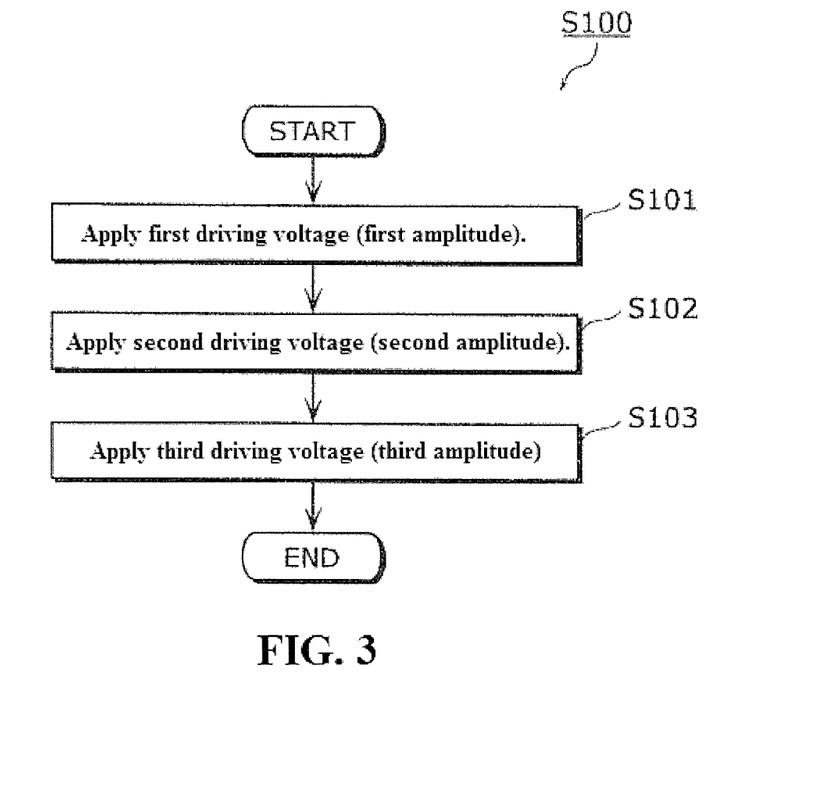
FIG. 3 is a flowchart illustrating a processing sequence for the operation for stopping at the furthest outer peripheral position according to an embodiment of the present invention.
Figure 4A:
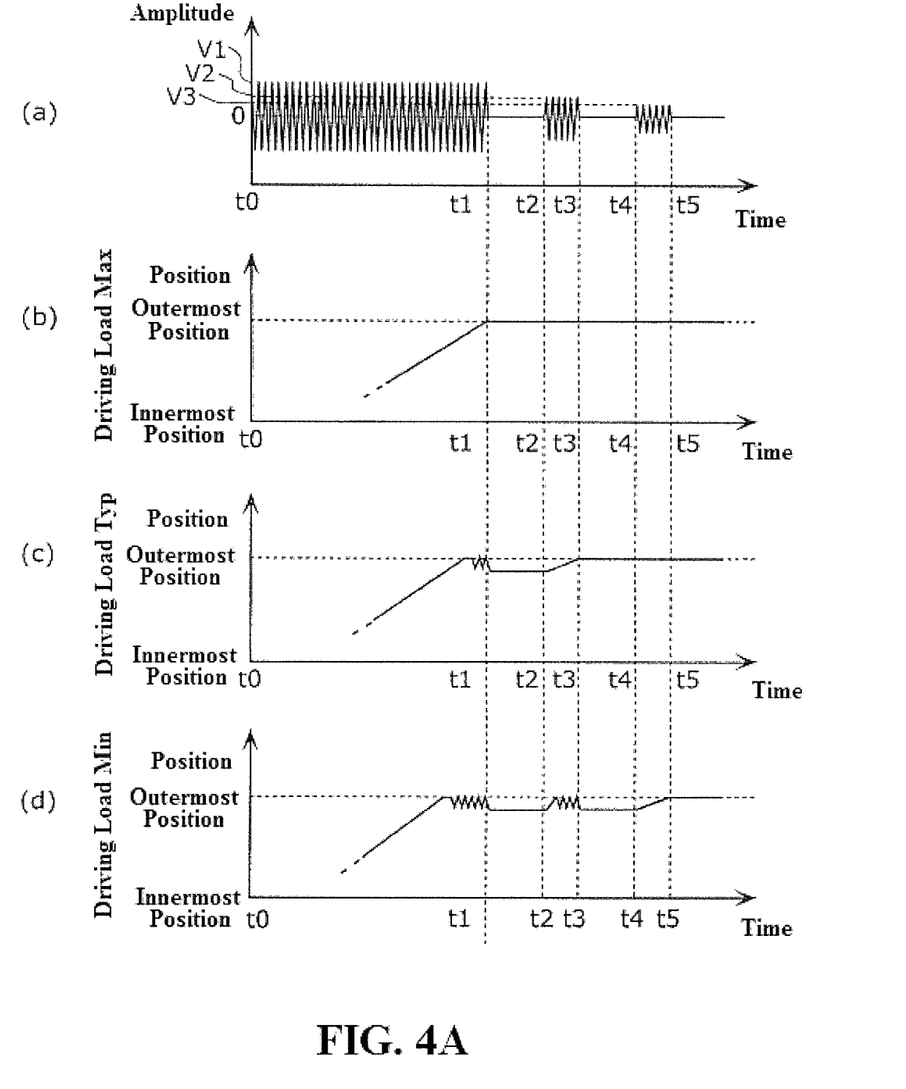
FIG. 4A is a graph illustrating the correspondence relationship between the driving voltage and the position of the driving mechanism in a first embodiment.

FIG. 3 is a flowchart illustrating an example of the procedural sequence (of Step S100 in FIG. 2) for moving the pickup 12 to the outermost position according to an embodiment of the present invention. FIG. 4A is a graph showing an example of the correspondence relationship between the driving voltage and the position of the driving mechanism when moving the pickup 12 to the outermost position according to an embodiment of the present invention. FIG. 4A(a) shows one example of the driving voltages that are applied to the driving mechanism. Additionally, FIG. 4A(b) shows one example of the positions of a pickup 12 of the driving load Max group, FIG. 4A(c) shows one example of the positions of a pickup 12 of the driving load Typ group, and FIG. 4A(d) shows one example of the positions of a pickup 12 of the driving load Min group.

At time t0, the system controller 15 may first apply a first driving voltage (the initial driving voltage) that has a voltage amplitude V1 (indicated as the "First Amplitude" in FIG. 3) (Step S101 in FIG. 3, First Procedure). The first driving amplitude, as illustrated in FIG. 4A(a) and (b), may be applied to the driving mechanism until the time t1 when the pickup 12 of the driving load Max group arrives at the outermost position.

As illustrated in FIG. 4A(b), at time t1, a pickup 12 of the driving load Max group may arrive at the outermost position. In contrast, as illustrated in FIG. 4A(c) and (d), gear tooth skipping may occur with the pickups 12 of the driving load Typ and Min groups, to be positioned toward the inner peripheral side by one gear tooth.

When time t1 arrives, the system controller 15, as illustrated in FIG. 4A(a), may start a procedure for reducing the voltage amplitude of the driving voltage in a stepwise manner (Second Procedure).

At time t2, the system controller 15, as illustrated in FIG. 4A(a), may apply a second driving voltage having a voltage amplitude V2 (indicated as "Second Amplitude" in FIG. 3, which is a portion of the adjustment driving voltage) (Step S102 in FIG. 3). The second driving voltage, as illustrated in FIG. 4A(a), may be applied to the driving mechanism until time t3. The time interval during which the second driving voltage is applied may be set so that the pickups 12 of the driving load Typ group will arrive at the outermost position.

At this time, with the voltage amplitude V2 the torque may be less than that of the voltage amplitude V1, and the driving mechanisms of the driving load Max group may not be driven, and thus, between the times t2 and t3, the pickups in the driving load Max group may be stopped at the outermost position.

As illustrated in FIG. 4A(c), at time t3, a pickup 12 of the driving load Typ group may arrive at the outermost position. In contrast, as illustrated in FIG. 4A(d), gear tooth skipping may occur with the pickups 12 of the driving load Min group, to be positioned toward the inner peripheral side by one gear tooth.

At time t4, the system controller 15, as illustrated in FIG. 4A(a), may apply a third driving voltage having a voltage amplitude V1 (indicated as "Third Amplitude" in FIG. 3, which is a portion of the adjustment driving voltage) (Step S103 in FIG. 3). The third driving voltage, as illustrated in FIG. 4A(a), may be applied to the driving mechanism until time t5. The time interval during which the third driving voltage is applied may be set so that the pickups 12 of the driving load Min group will arrive at the outermost position.

At this time, with the voltage amplitude V1 the torque may be less than that of the voltage amplitude V2, and the driving mechanisms of the driving load Max and Typ groups may not be driven, and thus, between the times t4 and t5, the pickups in the driving load Max and Typ groups may be stopped at the outermost position.

As illustrated in FIG. 4A(d), at time t5, a pickup 12 of the driving load Min group may arrive at the outermost position.

As a result, the pickups 12 of all of the groups, for driving loads Max, Typ, and Min, may arrive at the outermost position.

Referring again to FIG. 2, the system controller 15 may next output, to the thread driving circuit 14, a thread driving controlling signal for moving the pickup 12 to the innermost position (Step S110).

After moving the pickup 12 to the innermost position, the system controller 15 may output, to the thread driving circuit 14, a thread driving controlling signal for moving the pickup 12 to the re-zeroing position (the starting position for reading the disk) (Step S120).

In the present embodiment, the same time intervals may be provided between the application of the voltage amplitude V1 driving voltage and the application of the driving voltage of the voltage amplitude V2 (between time t1 and time t2), and between the application of the driving voltage of the voltage amplitude V2 and the driving voltage of the voltage amplitude V1 (between time t3 and time t4); however depending on the device configuration, the configuration may be one wherein such intervals are not provided.

Figure 4B:
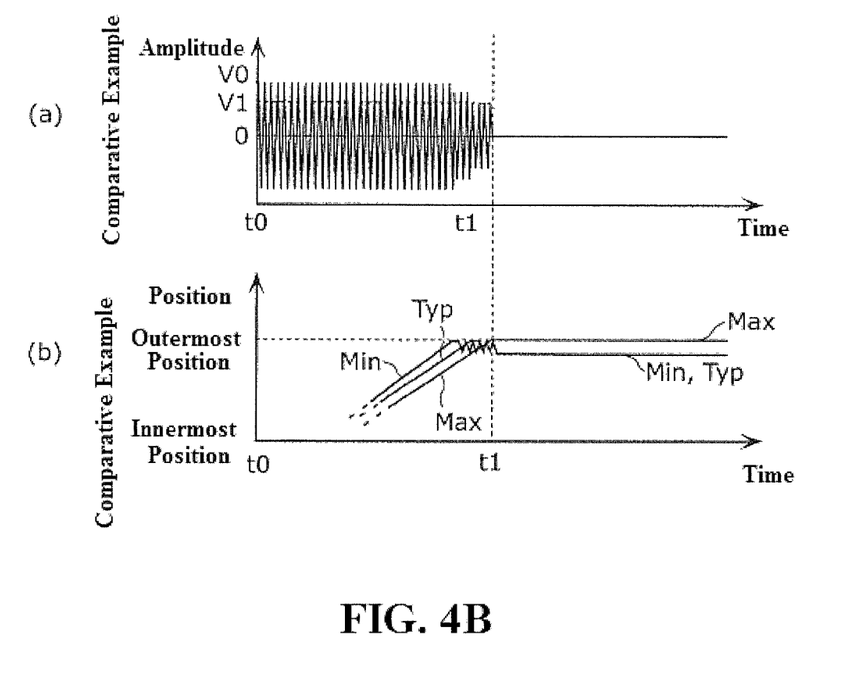
FIG. 4B is a graph illustrating the correspondence relationship between the driving voltage and the position of the driving mechanism in a comparative example.

FIG. 4B(a) illustrates one example of a driving voltage applied to a driving mechanism of a comparative example. FIG. 4B(a) shows a case wherein the driving voltage is reduced gradually in order to prevent a sudden stop at the time of stopping. Moreover, FIG. 4B(b) shows an example of the locations of the pickup 12 when the driving voltages are set as in FIG. 4B(a).

As described above, to keep from producing a driving mechanism that does not work, a driving voltage of a voltage amplitude or driving frequency that is able to drive the driving load Max driving mechanisms may be applied. Moreover, in order to prevent a sudden stop at the time of stopping, the driving voltage may be reduced before the pickup 12 arrives at the outermost position. Because of this, in FIG. 4B(a) the initial value of the voltage amplitude is set to a voltage amplitude V0 that is larger than the voltage amplitude V1. Furthermore, in FIG. 4B(a), the voltage amplitude is reduced in a stepwise manner from the voltage amplitude V0 to the voltage amplitude V1 before the pickups 12 of the driving load Max group arrives at the outermost position.

As illustrated in FIG. 4B(b), the pickups 12 of the driving load Max group may arrive at the outermost position and stop. However, in the comparative example, the application of the driving voltage of the voltage amplitude V2 at t2 through t3, and the application of the driving voltage of the voltage amplitude V3, at t4 through t5, in FIG. 4A(a) of the present embodiment are not performed, and thus the pickups 12 of the driving load Typ and Min groups may return by one gear tooth toward the inner peripheral side, and stop in that state.

In contrast, in the present embodiment, the driving voltages may be applied in three steps of voltage amplitudes, making it possible for the pickups 12 of the driving load Typ and Min groups to also stop at the outermost position, as illustrated in FIGS. 4 (c) and (d).

As explained above, the optical disc device and controlling method thereof in the first embodiment make it possible to handle component variability and, with a simple structure, to perform optical head positioning control with good precision.

(Embodiment 2)

A second embodiment of the optical disc device 10 and the controlling method thereof will be explained based on FIG. 6.

In the present embodiment, the method of applying the driving voltage when moving the pickup 12 to the outermost position may be different from that of the first embodiment. For example, while in the first embodiment the driving amplitudes of the driving voltages are reduced in a stepwise manner, in the present embodiment the voltage amplitudes of the driving voltages are reduced continuously.

The structure of the optical disc device 10 may be identical to the structure in the first embodiment, and thus the explanation thereof will be omitted in the present embodiment.

The operation of the optical disc device 10 in the present embodiment (the method of control) will be explained based on the examples shown in FIG. 2 and FIG. 6. FIG. 6 is a graph illustrating the correspondence relationship between the driving voltages and the positions of the driving mechanism when moving the pickup 12 to the outermost position. FIG. 6 (a) shows one example of the driving voltages that are applied to the driving mechanism in the first embodiment, and FIG. 6 (b) shows one example of the driving voltages that are applied to the driving mechanism in the present embodiment. FIG. 6 (a) is presented for a comparison with the first embodiment, for explaining the present embodiment.

As with the first embodiment, the system controller 15 may start re-zeroing control when the power supply is turned ON. The system controller 15 may first output, to the thread driving circuit 14, a thread driving controlling signal for moving the pickup 12 to the outermost position (Step S100).

Figure 6:
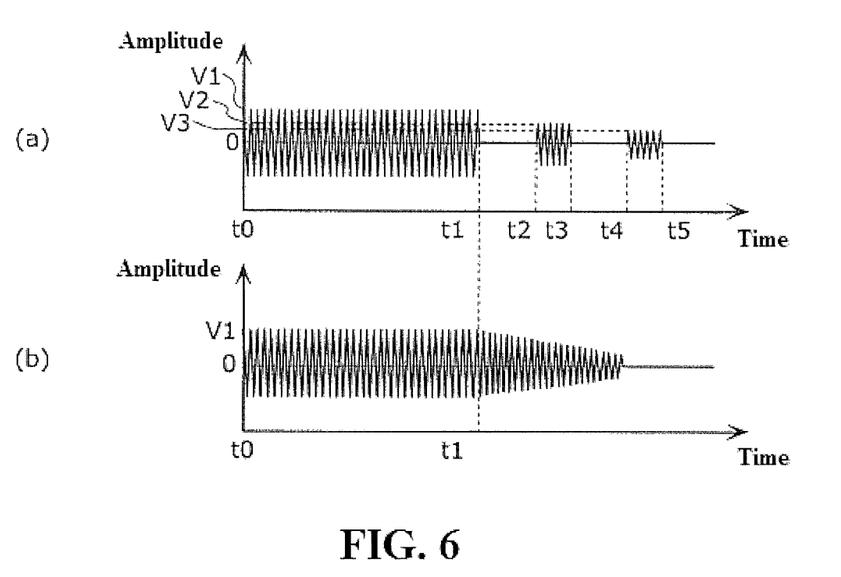
FIG. 6 is a graph illustrating the driving voltage in a second embodiment.

As with the first embodiment, at time t0, the system controller 15 may first apply a first driving voltage that has a voltage amplitude V1, as illustrated in FIG. 6 (b). As with the first embodiment, the first driving amplitude, as illustrated in FIG. 6 (b), may be applied to the driving mechanism until the time t1 when the pickup 12 of the driving load Max group arrives at the outermost position.

As with the first embodiment, illustrated in FIG. 4A(b), at time t1, a pickup 12 of the driving load Max group may arrive at the outermost position. In contrast, as with the first embodiment, illustrated in FIG. 4A(c) and (d), gear tooth skipping may occur with the pickups 12 of the driving load Typ and Min groups, to be positioned toward the inner peripheral side by one gear tooth.

When time t1 arrives, the system controller 15, as illustrated in FIG. 6 (b), may start a procedure for reducing the voltage amplitude of the driving voltage continuously (Second Procedure).

In this procedure, each driving mechanism may stop when the voltage amplitude of the driving voltage falls below the voltage amplitude required to drive the individual driving mechanism. Because the individual driving mechanism can be considered to have stopped in a state wherein it is pressing against the outside at the outermost position, it is possible to cause all of the driving mechanisms to stop at the outermost position.

As a result, the pickups 12 of all of the groups, for driving loads Max, Typ, and Min, may arrive at the outermost position.

Next, as with the first embodiment, the system controller 15 may first output, to the thread driving circuit 14, a thread driving controlling signal for moving the pickup 12 to the innermost position (Step S110).

As with the first embodiment, after moving the pickup 12 to the innermost position, the system controller 15 may output, to the thread driving circuit 14, a thread driving controlling signal for moving the pickup 12 to the re-zeroing position (the starting position for reading the disk) (Step S120).

While in the present embodiment, in the second procedure, the rate of reduction of the voltage amplitude of the driving voltage may be for example essentially constant, there is no limitation thereto. The system controller 15 may change the rate of reduction of the voltage amplitude of the driving voltage in the second procedure as appropriate. Moreover, after the voltage amplitude of the driving voltage has been reduced to the voltage amplitude for when the driving load is assumed to be the minimum (where it is assumed that there will be no more driving mechanisms that are driven), then either the reduction may be continued as is, or the application of the driving voltage may be terminated.

As explained above, in the optical disc device and controlling method thereof, in the second embodiment, when the voltage amplitude of the driving voltage has fallen below the voltage amplitude required for driving the applicable driving mechanism, the applicable driving mechanism can be assumed to be stopped in a state wherein it is pressing to the outside at the outermost position. Consequently, the optical disc device, and controlling method thereof, in the second embodiment enables handling of component variability and enables the optical pickups 12 to be stopped at the outermost position, with better precision, for all of the driving mechanisms.

(Embodiment 3)

A third embodiment of the optical disc device 10 and the controlling method thereof will be explained based on the example shown in FIG. 7.

In the present embodiment, the method of applying the driving voltage when moving the pickup 12 to the outermost position may be different from the methods of the first embodiment and the second embodiment. For example, while in the first embodiment the driving amplitudes of the driving voltages are reduced in a stepwise manner, in the present embodiment the driving frequencies of the driving voltages are reduced in a stepwise manner.

The structure of the optical disc device 10 may be identical to the structure in the first embodiment, and thus the explanation thereof will be omitted in the present embodiment.

An example of the operation of the optical disc device 10 in the present embodiment (the method of control) will be explained based on FIG. 2 and FIG. 7. FIG. 7 is a graph showing the correspondence relationship between the driving voltage and the position of the driving mechanism when moving the pickup 12 to the outermost position. FIG. 7 (a) shows one example of the driving voltages that are applied to the driving mechanism in the first embodiment, and FIG. 7 (b) shows one example of the driving voltages that are applied to the driving mechanism in the present embodiment. FIG. 7 (a) is presented for a comparison with the first embodiment, for explaining the present embodiment.

As with the first embodiment, the system controller 15 may start re-zeroing control when the power supply is turned ON. The system controller 15 may first output, to the thread driving circuit 14, a thread driving controlling signal for moving the pickup 12 to the outermost position (Step S100).

Figure 7:
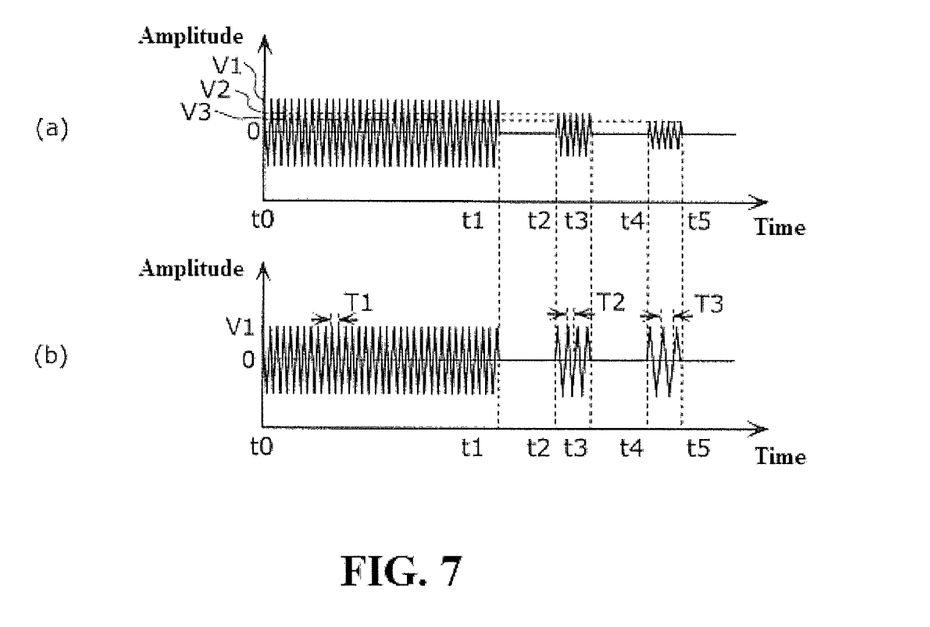
FIG. 7 is a graph illustrating the driving voltage in a third embodiment.

At time t0, the system controller 15 may first apply a first driving voltage that has a voltage amplitude V1 and a driving frequency F1 (=1/T1), as illustrated in FIG. 7 (b). As with the first embodiment, the first driving amplitude, as illustrated in FIG. 7 (b), may be applied to the driving mechanism until the time t1 when the pickup 12 of the driving load Max group arrives at the outermost position. In order to compare to the first embodiment, the first driving voltage may be the same as in the first embodiment.

As with the first embodiment, illustrated in FIG. 4A(b), at time t1, a pickup 12 of the driving load Max group may arrive at the outermost position. In contrast, as with the first embodiment, illustrated in FIG. 4A(c) and (d), gear tooth skipping may occur with the pickups 12 of the driving load Typ and Min groups, to be positioned toward the inner peripheral side by one gear tooth.

When time t1 arrives, the system controller 15, as illustrated in FIG. 7 (b), may start a procedure for reducing the driving frequency of the driving voltage in a stepwise manner (Second Procedure).

At time t2, the system controller 15, as illustrated in FIG. 7 (b), may reduce the driving frequency from F1 to F2 (=1/T2), and apply the driving voltage (corresponding to Step S102 in FIG. 3). Here the voltage amplitude may be V1. As illustrated in FIG. 7 (b), the system controller 15 may apply the driving voltage to the driving mechanism until time t3. The time interval during which the driving voltage at the driving frequency F2 is applied may be set so that the pickups 12 of the driving load Typ group will be caused to arrive at the outermost position.

At this time, with the driving frequency F2, the driving mechanisms of the driving load Max group are not driven, so between time t2 and t3, the pickups 12 of the driving load Max group are stopped at the outermost position.

As with the first embodiment, illustrated in FIG. 4A(c), at time t3, a pickup 12 of the driving load Typ group may arrive at the outermost position. In contrast, as with the first embodiment, illustrated in FIG. 4A(d), gear tooth skipping may occur with the pickups 12 of the driving load Min group, to be positioned toward the inner peripheral side by one gear tooth.

At time t4, the system controller 15, as illustrated in FIG. 7 (b), may reduce the driving frequency from F2 to F3 (=1/T3), and apply the driving voltage (corresponding to Step S103 in FIG. 3). Here the voltage amplitude may be V1. As illustrated in FIG. 7 (b), the system controller 15 may apply the driving voltage to the driving mechanism until time t5. The time interval during which the driving voltage at the driving frequency F3 is applied may be set so that the pickups 12 of the driving load Min group will be caused to arrive at the outermost position.

At this time, with the driving frequency F3, the driving mechanisms of the driving load Max and Typ groups are not driven, so between time t4 and t5, the pickups 12 of the driving load Max and Typ groups may be stopped at the outermost position.

As with the first embodiment, illustrated in FIG. 4A(d), at time t5, a pickup 12 of the driving load Min group may arrive at the outermost position.

As a result, the pickups 12 of all of the groups, for driving loads Max, Typ, and Min, may arrive at the outermost position.

Next, as with the first embodiment, the system controller 15 may first output, to the thread driving circuit 14, a thread driving controlling signal for moving the pickup 12 to the innermost position (Step S110).

As with the first embodiment, after moving the pickup 12 to the innermost position, the system controller 15 may output, to the thread driving circuit 14, a thread driving controlling signal for moving the pickup 12 to the re-zeroing position (the starting position for reading the disk) (Step S120).

As explained above, the optical disc device and controlling method according to the third embodiment are able to handle component variability and perform positioning control of the optical head with good precision through a simple structure, through controlling the driving frequency instead of the voltage amplitude of the first embodiment.

While in the present embodiment the driving frequency of the driving voltage may be for example reduced in a stepwise manner, according to one or more embodiments the structure may be a structure wherein the driving frequency is reduced continuously (corresponding to controlling the driving frequency instead of the voltage amplitude in the second embodiment).

As with the second embodiment, in this case it is possible to handle the component variability to stop the pickups 12, for all the driving mechanisms, at the outermost position with better precision.

(Other Embodiments)

The present invention is not limited to the exemplary embodiments of optical disc devices 10 described above.

(1) While in the first through third embodiments either the voltage amplitude or the driving frequency for the driving voltage may be for example reduced either stepwise or continuously, according to one or more other embodiments both the voltage amplitude and the driving frequency may be reduced, either stepwise or continuously.

(2) While in the first embodiment and the second embodiment, set forth above, the voltage amplitude of the driving voltage applied in the first procedure may be for example V1, there is no limitation thereto. The voltage amplitude of the driving voltage applied in the first procedure may be a voltage amplitude that is greater than V1. Moreover, in the first embodiment and the second embodiment, set forth above, the voltage amplitude of the driving voltage in the first procedure may be, for example, a constant value, but there is no limitation thereto. Rather, as in the comparative example illustrated in FIG. 4B(a), the structure may be a structure wherein the initial value for the voltage amplitude may be V0 and the value may be then reduced, either stepwise or continuously, to V1.

Similarly, while in the third embodiment, set forth above, the driving frequency of the driving voltage applied in the first procedure may be for example F1, there is no limitation thereto. The driving frequency of the driving voltage applied in the first procedure may be a driving frequency that is greater than F1. Moreover, while in the third embodiment, set forth above, the driving frequency of the driving voltage in the first procedure may be for example a fixed value, there is no limitation thereto. Rather the structure may be a structure wherein the initial value for the driving frequency is F0, which is larger than F1, and the value is then reduced, either stepwise or continuously, to F1.

(3) While in the first through third embodiments, set forth above, the optical disc device 10 may be for example a DVD player 10, there is no limitation thereto. The optical disc device 10 may be another device, such as a BD. Moreover, the disc that is played back by the optical disc device 10 is not limited to a DVD disc, insofar as it is a disk that can be played back by the optical disc device 10.

(4) While in the first through third embodiments, set forth above, the system controller 15 of the optical disc device 10 may be provided with a CPU 15a, a RAM 15b, and a ROM 15c, there is no limitation thereto. The system controller 15 may be structured as a single-system LSI (Large-Scale Integrated) circuit, an ASIC (Application Specific Integrated Circuit), an FPGA (Field Programmable Gate Array), or the like. A system LSI circuit is an ultra-multifunctional LSI circuit structured through integrating a large number of structural portions into a single chip, and, for example, is a computer system that is structured including a microprocessor, a ROM, a RAM, and the like. A computer program is stored in the RAM. The microprocessor operating in accordance with the computer program causes the system LSI chip to achieve the functions.

Furthermore, one or more embodiments of the present invention may be one wherein an application program, comprising the procedural sequences of the controlling method for the pickup 12 is recorded onto a computer-readable non-volatile memory medium such as a flexible disk, a hard disk, a CD-ROM, an MO, a DVD, a DVD-ROM, a DVD-RAM, a BD, a semiconductor memory, or the like. Moreover, it may be the digital signals described above, recorded onto these non-volatile memory media.

Moreover, one or more embodiments of the present invention may be the computer program set forth above or the digital signals set forth above, transmitted through, for example, a data broadcast or a network, such as an electronic circuit, a wired or non-wired circuit, the Internet, or the like.

Furthermore, the embodiments and modified examples set forth above may be combined.

[Applications in The Industry]

The present invention can be applied to various types of optical disc devices and controlling methods thereof for audio applications, video applications, and storage applications (PC applications). The various types of disc devices include removable, portable, and vehicle-mounted devices, and game devices, digital cameras, and the like. The optical disc device and controlling method thereof, set forth above, can provide an optical disk device, and controlling method thereof, wherein positioning to the outermost position in re-zeroing control can be performed with good precision.

While the invention has been described with respect to a limited number of embodiments, those skilled in the art, having benefit of this disclosure, will appreciate that other embodiments can be devised which do not depart from the scope of the invention as claimed herein. Furthermore, those of ordinary skill in the art would appreciate that certain components or "portions" of one or more embodiments of the present invention may be implemented by a circuit, processor, etc. using known methods. Accordingly, the scope of the invention should be limited only by the attached claims.

EXPLANATION OF REFERENCE NUMBERS

10: Optical Disc Device
11: Spindle Motor
12: Pickup
12a: Servo Circuit
12b: Thread Driving Mechanism
12c: Thread Motor
13: Servo Controlling Circuit
14: Thread Driving Circuit 15: System Controller
15a: CPU
15b: RAM
15c: ROM
16: Photodetecting Portion
17: Signal Processing Circuit
20: DVD Disc
30: Television Receiver
31: Speaker
32: Displaying Portion
40: Remote Control Device

What is claimed is:

1. An optical disc device comprising:
a pickup;
a plurality of driving mechanisms, wherein one of the driving mechanisms drives the pickup; and
a driving controlling portion that applies an initial driving voltage to one of the driving mechanisms over a specific time interval up until the pickup arrives at an outermost position on an outer peripheral side, the initial driving voltage causing the pickup to arrive at the outermost position,
wherein after the specific time interval has elapsed, the driving controlling portion applies, to the one of the driving mechanisms, an adjustment driving voltage of a voltage amplitude less than a voltage amplitude of the initial driving voltage or a driving frequency less than a driving frequency of the initial driving voltage, and
wherein the plurality of the driving mechanisms comprises at least two types of driving loads, and the voltage amplitude and the driving frequency of the initial driving voltage are a voltage amplitude and driving frequency able to drive the one of the driving mechanisms having the largest driving load from among the plurality of driving mechanisms.

2. The optical disc device as set forth in claim 1, wherein the driving controlling portion reduces the voltage amplitude of the adjustment driving voltage in a stepwise manner.

3. The optical disc device as set forth in claim 1, wherein the driving controlling portion reduces the voltage amplitude of the adjustment driving voltage continuously.

4. The optical disc device as set forth in claim 1, wherein the driving controlling portion reduces the driving frequency of the adjustment driving voltage in a stepwise manner.

5. The optical disc device as set forth in claim 1, wherein the driving controlling portion reduces the driving frequency of the adjustment driving voltage continuously.

6. The optical disc device as set forth in claim 1, wherein the voltage amplitude or driving frequency of the adjustment driving voltage is a voltage amplitude or driving frequency able to drive the driving mechanism with a smallest driving load from among the plurality of driving mechanisms, and
an application interval for the adjustment driving voltage is an interval set in advance so that the driving mechanism with the smallest driving load will arrive at the outermost position.

7. The optical disc device as set forth in claim 2, wherein the driving controlling portion reduces the driving frequency of the adjustment driving voltage in a stepwise manner.

8. The optical disc device as set forth in claim 3, wherein the driving controlling portion reduces the driving frequency of the adjustment driving voltage in a stepwise manner.

9. The optical disc device as set forth in claim 2, wherein the driving controlling portion reduces the driving frequency of the adjustment driving voltage continuously.

10. The optical disc device as set forth in claim 3, wherein the driving controlling portion reduces the driving frequency of the adjustment driving voltage continuously.

11. A controlling method for an optical disc device provided with a pickup and a plurality of driving mechanisms, wherein one of the driving mechanisms drives the pickup, comprising:
applying an initial driving voltage to the one of the driving mechanisms over a specific time interval up until the pickup arrives at an outermost position on an outer peripheral side, the initial driving voltage causing the pickup to arrive at the outermost position; and
applying, to the one of the driving mechanism after the specific time interval has elapsed, an adjustment driving voltage of a voltage amplitude less than a voltage amplitude of the initial driving voltage or a driving frequency less than a driving frequency of the initial driving voltage,
wherein the plurality of the driving mechanisms comprises at least two types of driving loads, and the voltage amplitude and the driving frequency of the initial driving voltage are a voltage amplitude and driving frequency able to drive the driving mechanism having the largest driving load from among the plurality of driving mechanisms.

12. The controlling method as set forth in claim 11, further comprising:
reducing the voltage amplitude of the adjustment driving voltage in a stepwise manner.

13. The controlling method as set forth in claim 11, further comprising:
reducing the voltage amplitude of the adjustment driving voltage continuously.

14. The controlling method as set forth in claim 11, further comprising:
reducing the driving frequency of the adjustment driving voltage in a stepwise manner.

15. The controlling method as set forth in claim 11, further comprising:
reducing the driving frequency of the adjustment driving voltage continuously.

16. A non-transitory computer-readable medium having computer-executable instructions adapted to cause a computer to perform the controlling method according to claim 11.

17. An optical disc device comprising:
a pickup;
a plurality of drivers, wherein one of the drivers drives the pickup; and
a driving controller that applies an initial driving voltage to one of the drivers over a specific time interval up until the pickup arrives at an outermost position on an outer peripheral side, the initial driving voltage causing the pickup to arrive at the outermost position,
wherein after the specific time interval has elapsed, the driving controller applies, to the one of the drivers, an adjustment driving voltage of a voltage amplitude less than a voltage amplitude of the initial driving voltage or a driving frequency less than a driving frequency of the initial driving voltage, and
wherein the plurality of the drivers comprises at least two types of driving loads, and the voltage amplitude and the driving frequency of the initial driving voltage drive the one of the drivers having the largest driving load from among the plurality of drivers.

18. The optical disc device as set forth in claim 17, wherein the driving controller reduces the voltage amplitude of the adjustment driving voltage in a stepwise manner.

19. The optical disc device as set forth in claim 17, wherein the driving controller reduces the voltage amplitude of the adjustment driving voltage continuously.

20. The optical disc device as set forth in claim 17, wherein the voltage amplitude or driving frequency of the adjustment driving voltage is able to drive the driver with a smallest driving load from among the plurality of drivers, and an application interval for the adjustment driving voltage is an interval set in advance so that the driver with the smallest driving load will arrive at the outermost position.

\* \* \* \* \*